(12) United States Patent
Mcloughlin et al.

(10) Patent No.: US 10,850,674 B1
(45) Date of Patent: Dec. 1, 2020

(54) GEAR BAG WITH MOUNTING SYSTEM

(71) Applicants: John E. Mcloughlin, Hauppauge, NY (US); Phung Le, Lake Grove, NY (US)

(72) Inventors: John E. Mcloughlin, Hauppauge, NY (US); Phung Le, Lake Grove, NY (US)

( * ) Notice: Subject to any disclaimer, the term of this patent is extended or adjusted under 35 U.S.C. 154(b) by 0 days.

(21) Appl. No.: 16/449,872

(22) Filed: Jun. 24, 2019

(51) Int. Cl.
*B60R 7/00* (2006.01)
*B60R 7/10* (2006.01)
*A62C 99/00* (2010.01)
*B60R 7/04* (2006.01)

(52) U.S. Cl.
CPC .............. *B60R 7/10* (2013.01); *A62C 99/009* (2013.01); *B60R 7/04* (2013.01)

(58) Field of Classification Search
CPC ............ B60R 7/10; B60R 7/04; A62C 99/009

USPC ......................................................... 224/311
See application file for complete search history.

(56) References Cited

U.S. PATENT DOCUMENTS

| 5,116,010 A | * | 5/1992 | McMasters | B60R 7/14 224/311 |
| 5,372,289 A | * | 12/1994 | Dachicourt | B60R 7/02 224/281 |
| 5,653,318 A | * | 8/1997 | Field | 190/111 |

* cited by examiner

*Primary Examiner* — Peter N Helvey
(74) *Attorney, Agent, or Firm* — Louise S. Heim

(57) ABSTRACT

A storage assembly includes a gear bag having a rigid mounting plate secured to its bottom wall, and a pair mounting rails for receiving the edges of the mounting plate. The mounting rails are designed to be mounted in spaced-apart relationship on a ceiling, wall, or floor of an emergency vehicle, and to receive the edges of the mounting plate. The gear bag defines at least one compartment sized and shaped to contain a personal safety item such as a helmet.

8 Claims, 4 Drawing Sheets

US 10,850,674 B1

GEAR BAG WITH MOUNTING SYSTEM

TECHNICAL FIELD

The present disclosure relates in general to luggage and other containers for storing and transporting equipment. More particularly, the disclosure relates to a personal gear bag having a mounting system for securing it to an interior surface of a vehicle.

BACKGROUND

Firefighters must wear protective helmets to prevent head injuries due to falling debris at the scene of a fire or other emergency. Until recently, it was common for these individuals to wear their helmets in their fire trucks while being transported to or from the scene. However, helmets have been found to interfere with the occupant restraint systems on firetrucks and to increase the risk of head or neck injury during a crash. This led the National Fire Protective Association (NFPA) to state that occupants of a firefighting vehicle should not wear their helmets while the vehicle is in motion, and to revise their standard for Automotive Fire Apparatus (NFPA 1901) to require proper helmet storage during vehicle movement.

In addition to helmets, firefighters are issued a wide variety of other protective devices and garments such as gloves, boots, respirators, hoods, and gas masks, all of which frequently come into with toxic and carcinogenic contaminants such as polynuclear aromatic hydrocarbons (PAHs), diesel exhaust particles, hydrogen cyanide, mold, arsenic, phthalate plasticizers, and polybromiated diphenyl ether flame retardants (PBDEs). Some of these contaminants can be absorbed through a firefighter's skin, while others may be off-gassed and inhaled by the firefighters when they remove their respiratory protection. As a result, the NFPA Standard on Selection, Care, and Maintenance of Protective Ensembles for Structual Firefighting and Proximity Firefighting (NFPA 1851) has recently been revised to prohibit soiled or contaminated clothing from being transported in the cab of a firefighting vehicle unless placed in an airtight protective case or bag to prevent cross-contamination.

Accordingly, there exists a need for an airtight bag for storing a firefighter's personal protective including helmets and other gear such as gloves, boots, respirators, hoods, and gas masks in the cab of a firefighting vehicle. The bag must include a plurality of distinct compartments to prevent cross-contamination among items. Furthermore, the bag must be secured within the cab in such a way that it does not become a projectile when the vehicle stops, turns, or starts suddenly, and does not obstruct the movement of firefighters trying to quickly enter or exit the vehicle.

SUMMARY

A storage assembly according to the present disclosure includes a gear bag having a rigid mounting plate secured to its bottom wall, and a pair of mounting rails configured to be mounted in spaced-apart relationship on the ceiling or other surface of an emergency vehicle, and to receive the edges of the mounting plate. The bag defines at least one compartment sized and shaped to contain a personal safety item. In one embodiment, the bag defines at least three separate compartments, each sized and shaped to contain a personal safety items and configured to prevent cross-contamination between items. In a preferred embodiment, one of the compartments is sized and shaped to contain a firefighting helmet.

In another aspect of the invention, the bag is free of any openings or pores that could admit fine particles, and includes a closure assembly configured to prevent particles or other debris from entering or exiting the helmet compartment or any of the pockets. The closure assembly may comprise zippers.

In still another embodiment of the invention, the bag includes still another pocket containing a plurality of disposable and sealable liner bags for encasing individual items before storing the items in the bag.

In another aspect of the invention, the mounting plate is I-shaped and includes two enlarged portions and a connector portion extending between the two enlarged end portions. Each of the rails includes an upper portion and a lower portion, with a groove defined between the upper and lower portions. The upper portion of each rail includes a gap having a length equal to the length of one of the enlarged end portions. A retention assembly is provided for maintain the mounting plate in a fixed position relative to the mounting rails.

DETAILED DESCRIPTION

Figure 1:
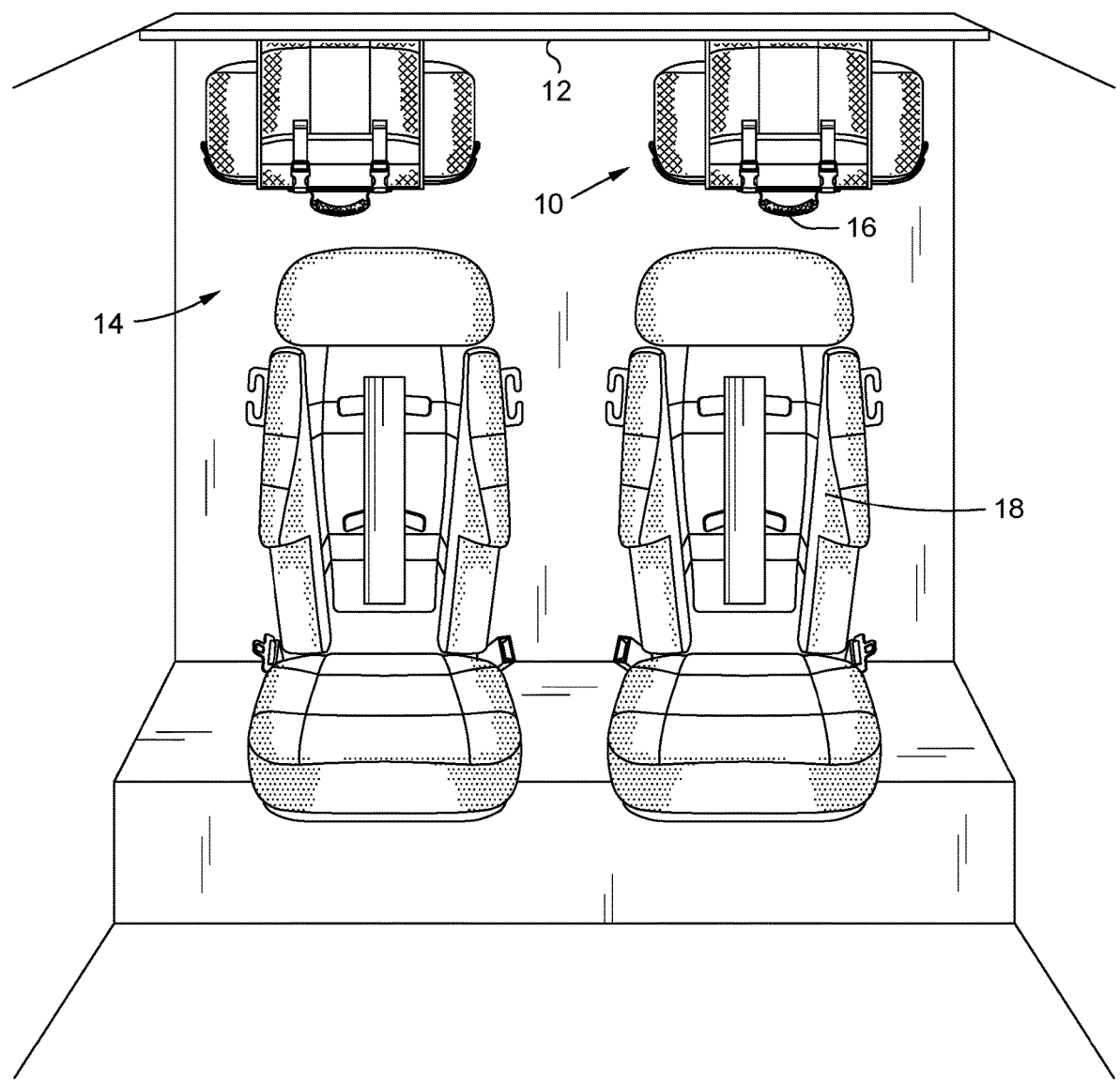
FIG. 1 is a perspective view showing a pair of gear bags according to the present disclosure, mounted on the ceiling of a firefighting vehicle.

FIG. 1 is a perspective view showing a pair of gear bags 10 according to the present disclosure, mounted in a top-down position on the ceiling 12 of the passenger compartment 14 of an emergency vehicle such as a fire truck. Each of the gear bags 10 includes a handle 16 allowing a user to easily grab the bag and carry it, along with its contents, after removing it from the ceiling 12. Each gear bag 10 is shown here as being positioned directly above a passenger seat 18 in the vehicle, but the exact mounting location of the bags may vary depending on the size configuration and the vehicle. For instance, in larger vehicles, it may be desirable to mount the gear bags above an aisle between the seats. Alternatively, the bags could be mounted on the walls or floor of a vehicle.

Figure 2:
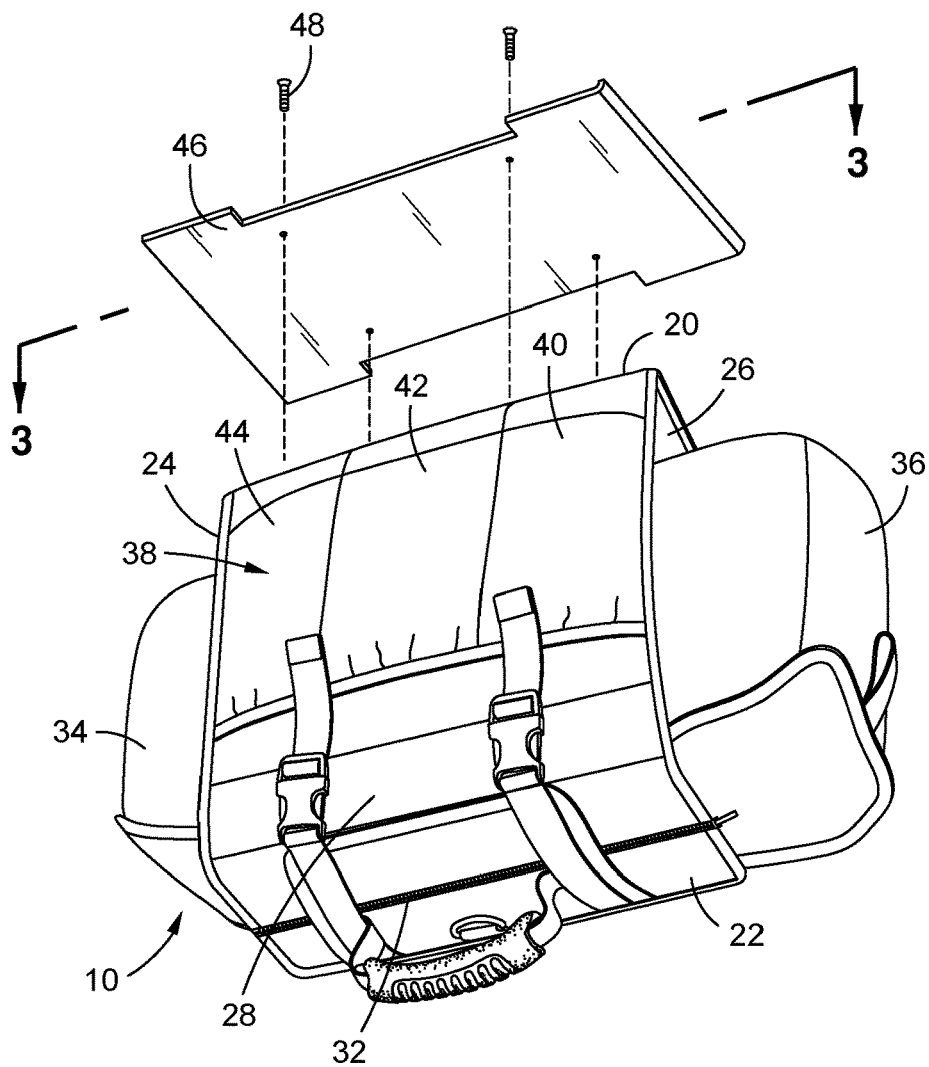
FIG. 2 is a perspective view showing one of the gear bags of FIG. 1 in exploded relationship to a mounting plate.
Figure 3:
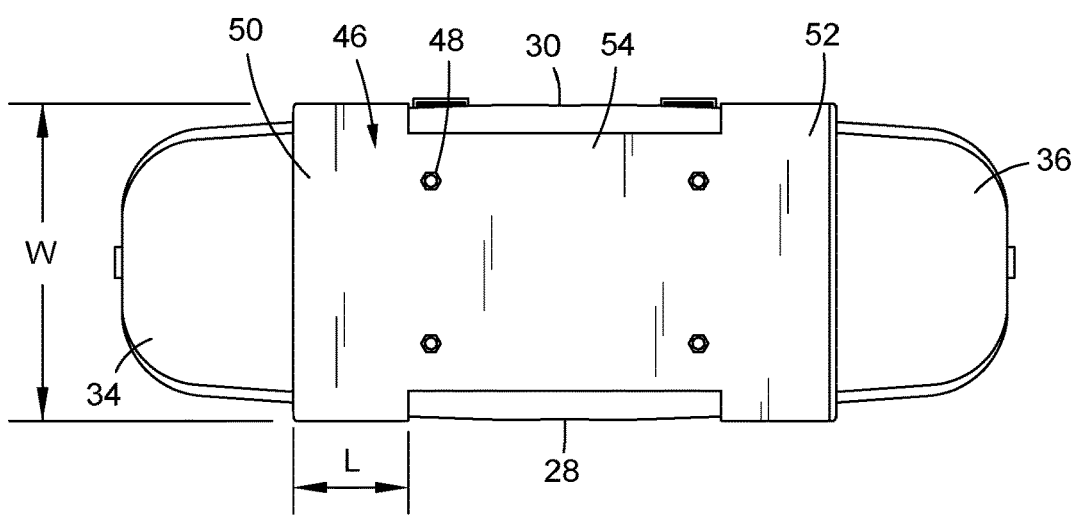
FIG. 3 is a plane view of the underside of the gear bag of FIG. 2, assembled with the mounting plate.

As best seen in FIGS. 2 and 3, each bag 10 includes a bottom wall 20, a top wall 22, a pair of end walls 24, 26, a front wall 28, and a rear wall 30. The top wall 22 includes a zippered opening 32 that provides access to a compartment sized and shaped to contain a firefighting helmet. For instance, the helmet compartment may be approximately 12-17 inches in length, 9-15 inches in width, and 5-12 inches in depth. Each end wall 24, 26 supports a zippered end pocket 34, 36 sized and shaped to contain an additional piece of firefighting gear. For instance, one end pocket may be sized and shaped to contain a safety hood, and the other end pocket may be sized and shaped to contain a face mask. Alternatively, either or both end pockets may be sized and shaped to contain a firefighting glove, or a pair of firefighting gloves. In one embodiment, each end pocket 34, 36 may define a compartment having a length that is about one-fourth to one half the length of the helmet compartment, a width that is ¼" to ½" less than the width of the helmet compartment, and a depth that is 1" to 2" inches less than the depth of the helmet compartment.

The front wall 28 supports an elongated, zippered front pocket 38 that is also sized and shaped to contain at least one piece of firefighting gear, such as a safety hood, face mask, or gloves. In one embodiment, the length of the elongated front pocket 38 is approximately the same as the length of the helmet compartment, and the height of the elongated front pocket 38 is about one-half to about three-fourths of the depth of the helmet compartment. The elongated front pocket 38 may optionally be divided into three smaller pockets 40, 42, 44, each of which is sized and shaped to contain a single item such as a firefighting glove, a safety hood, or a face mask. One of the pockets 40, 42, 44 may contain a packet of tissues enabling a firefighter to wipe potentially toxic or carcinogenic substances off the gear before storing it.

All the walls 20, 22, 24, 26, 38, 30 and all the pockets 34, 36, 38 of the gear bag 10 are made of a sturdy, water-resistant, and easily cleanable material such as vinyl. The material should have no mesh portions, and no small openings or pores that could allow fine particles to enter the bag. Furthermore, a closure assembly should be provided for preventing debris or particles from entering the pockets 34, 36, 38 or the helmet compartment. In a preferred embodiment, the closure assembly comprises a plurality of zippers, including a zipper for the helmet compartment, a zipper for each end compartment 34, 36, and at least one zipper for the elongated front pocket 38 (if the elongated front pocket is divided into smaller pockets, it may be desirable to provide a separate zipper for each small pocket 40, 42, 44). The closure assembly and the absence of small openings or pores in the gear bag 10 are critical, since firefighting environments are often filled with soot containing PCBs, formaldehyde, benzene, asbestos, and a variety of other carcinogenic materials. Since firefighters have been found to suffer from cancer at much higher rates than the general public, it is essential that they clean off their gear before placing it their gear bag, and that once in the bag, there is minimal potential for contaminants to enter the bag. Conversely, if contaminants should be bought into the bag with incompletely cleaned gear, there should be minimal potential for those contaminants to drop out of the bag, where they might then be deposited onto the floors of the firefighters' personal vehicles or even their homes.

In one preferred embodiment, the gear bag 10 includes an additional pocket for storing a plurality of disposable and sealable liner bags. Thus, before placing any individual item in its compartment or pocket, the user may remove one of the liner bags, place the item in the liner bag, and seal the liner bag. This prevents the interior of the pockets or compartments from being contaminated themselves.

A mounting plate 46 made from a strong, rigid material such as steel or aluminum is secured by fasteners 48 such as bolts or rivets to the bottom wall 20 of the gear bag 10. As best seen in FIG. 3, the mounting plate 46 is I-shaped, with a pair of enlarged ends 50, 52 separated by a connector portion 54. Each enlarged end 50, 52 of the mounting plate 46 has a length $L_1$ and a width W.

Figure 4:
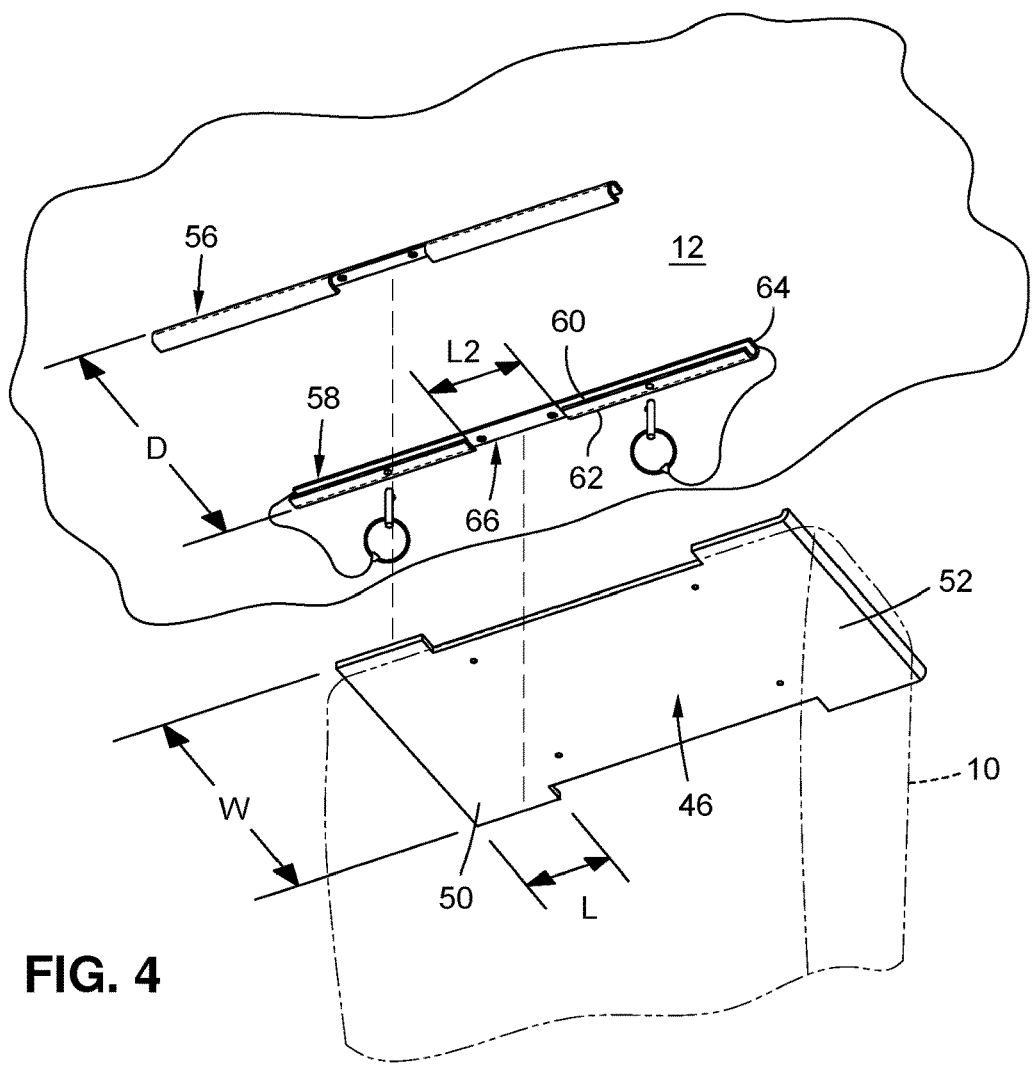
FIG. 4 is a perspective view showing the mounting plate of FIGS. 2 and 3, in exploded relationship to a pair of mounting rails on the ceiling of the firefighting vehicle, and with the gear bag shown in phantom.

FIG. 4 shows a pair of mounting rails 56, 58 mounted on the ceiling 12 of the crew cabin. The rails are separated by a distance D that is slightly greater than the width W of the enlarged ends 50, 52 of the mounting plate. Each rail is essentially C-shaped, with a bottom portion 60, a top portion 62, and a groove 64 defined between the bottom and top portions 60, 62. A gap 66 is formed in the center of the top portion 62 of each rail 56, 58. The length $L_2$ of the gap 66 is slightly greater than the length L of each of the enlarged ends 46, 48 of the mounting plate 46.

Figure 5:
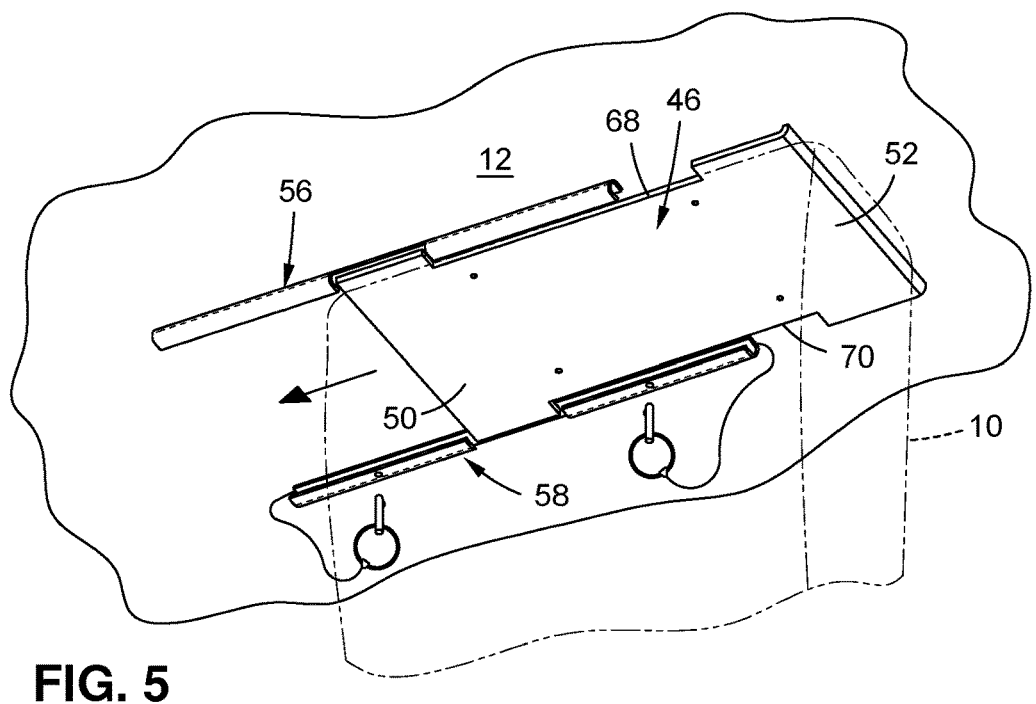
FIG. 5 is a perspective view showing the mounting plate in a partially inserted position between the mounting rails, and with the gear bag shown in phantom.
Figure 6:
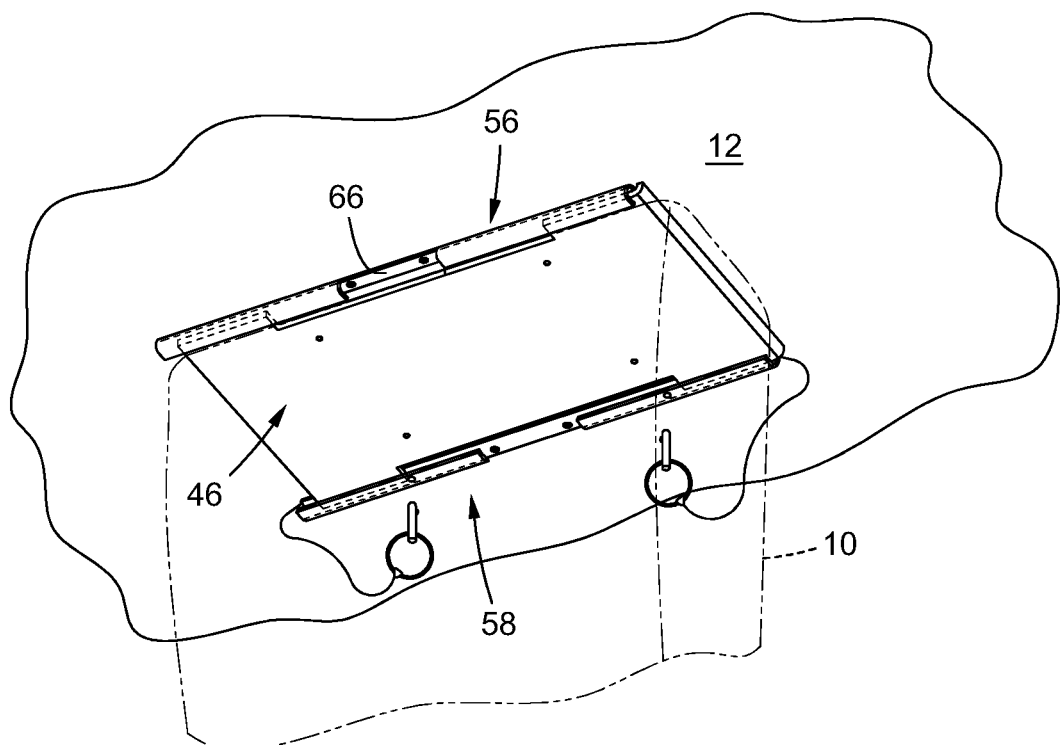
FIG. 6 is a perspective view showing the mounting plate in a fully inserted position between the mounting rails, and with the gear bag shown in phantom

To mount the gear bag 10 on the ceiling 12, a firefighter positions the gear bag 10 bottom-side up so that the one of the enlarged ends 50 of the mounting plate 46 is aligned with the gap 66 in the top portion 62 of each of the rails 56, 58, and the side edges 68, 70 of the connector portion 54 are received within the groove 64, as shown in FIG. 5. The firefighter pushes the opposite enlarged end 52 towards the gap 66, until the entire length of the mounting plate 46 is contained within the rails 56, 58, as shown in FIG. 6.

Figure 7:
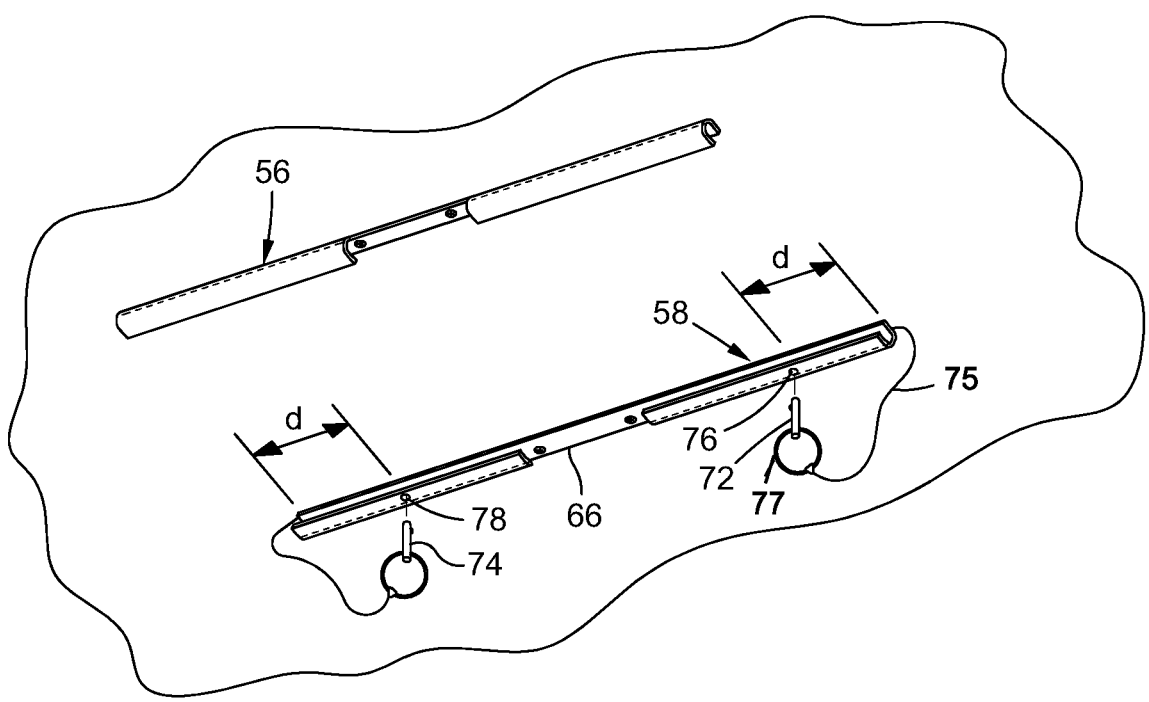
FIG. 7 is a perspective view showing an arrangement for locking the mounting plate between the mounting rails.

A retention assembly for maintaining the mounting plate 46 in a fixed position relative to the rails 56, 58 is shown in FIG. 7. In the illustrated embodiment, the retention assembly comprises a pair of detent pins 72, 74, each attached by a connector cable 75 to an opposite end of one of the mounting rails 58. Each pin is configured to be inserted through a hole 76, 78 in the upper portion of one of the mounting rails 58. The distance d between each hole 76, 78 and the nearest end of the mounting plate 46 is slightly greater than the length L of the enlarged ends 50, 52 of the mounting plate 46. Thus, when the pins 72, 74 are inserted, the enlarged ends 50, 52 are prevented from sliding past the pins. Each pin 72, 74 has an enlarged ring 77 at one end that functions as a manipulation element allowing the pin to be easily grasped.

To remove a gear bag from the ceiling, a firefighter simply removes the detent pins 72, 74 from their respective holes 76, 78, slides the bag along the rails 56, 58 until one of the enlarged ends 50, 52 is aligned with the gap 66. The bag can then be pulled away from the ceiling and carried wherever needed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A storage assembly comprising:
a gear bag having a bottom; and
an attachment system for securing the gear bag to a surface in a personnel-accommodating cabin of an emergency vehicle, the attachment system including
a first mounting component fixed to the surface;
a second mounting component fixed to the bottom of the gear bag and cooperating with the first component to detachably secure the gear bag to the surface;
a first retention element coupled to the first mounting component;

a second retention element coupled to the second mounting component and mating with the second element to prevent accidental separation of the first and second mounting components; and a manipulation element coupled to one of the first and second elements and configured to facilitate intentional separation of the second mounting element from the first mounting element.

2. The storage assembly according to claim 1, wherein:

the first mounting component comprises a pair of spaced-apart mounting rails secured to the surface, each of the rails defining a groove; and the second mounting component comprises a rigid mounting plate secured to the bottom of the gear bag, the rigid mounting plate having planar side edges configured to be inserted in the grooves defined by the mounting rails.

3. The storage assembly according to claim 2, wherein:

the first retention element comprises an opening formed in one of the mounting rails; and the second retention element comprises a detent pin configured to be inserted through the opening in the mounting rail.

4. The storage assembly according to claim 2, wherein the mounting plate is I-shaped and includes:

two enlarged end portions, each end portion having a length and a width, and a connector portion extending between the two enlarged end portions, the connector portion having a width that is less than the width of each of the two enlarged portions; and each of the rails includes a pair of ends, an upper portion, and a lower portion, wherein the groove is defined between the upper and lower portions, and wherein the upper portion of each rail includes a gap having a length equal to the length of one of the enlarged end portions.

5. The storage assembly according to claim 4, further comprising a retention assembly configured to maintain the mounting plate in a fixed position relative to the mounting rails, wherein:

the first retention element comprises an opening located in the upper portion of one of the rails, wherein the distance from the opening to the nearest end of the rail is slightly greater than the length of one of the enlarged end portions of the mounting plate; and the second retention element comprises a detent pin configured to extend through the aligned first and second openings in the rail and to block the one enlarged end of the mounting plate from movement in one direction.

6. The storage assembly according to claim 5, further comprising a connector cable coupling the detent pin to the end of the rail.

7. The storage assembly according to claim 3, wherein the manipulation element comprises an enlarged ring at an end of the detent pin.

8. The storage assembly according to claim 5, wherein the manipulation element comprises an enlarged ring at an end of the detent pin.

* * * * *